United States Patent [19]
Irita

[11] Patent Number: 5,899,341
[45] Date of Patent: May 4, 1999

[54] METHOD OF AND APPARATUS FOR TRANSPORTING LEAD FRAME

[75] Inventor: Ryouichi Irita, Kasuga, Japan

[73] Assignee: Matsushita Electric Industrial Co., Ltd., Osaka, Japan

[21] Appl. No.: 09/030,588

[22] Filed: Feb. 25, 1998

[30] Foreign Application Priority Data

Feb. 26, 1997 [JP] Japan ................................ 9-041934

[51] Int. Cl.$^6$ .......................... B07C 5/344; B65G 59/02; B65G 57/00
[52] U.S. Cl. ....................... 209/571; 414/797; 414/789.5
[58] Field of Search .................... 209/571, 556, 209/576; 271/262, 263, 265.04; 414/797, 789.5

[56] References Cited

U.S. PATENT DOCUMENTS

| | | | |
|---|---|---|---|
| 3,826,485 | 7/1974 | Shindo | 414/797 |
| 4,632,718 | 12/1986 | Shimizu | 271/262 |
| 4,905,982 | 3/1990 | Baba et al. | 271/262 |
| 4,960,361 | 10/1990 | Melzer | 414/797 |
| 5,143,510 | 9/1992 | Takamura et al. | 414/797 |
| 5,653,575 | 8/1997 | Park et al. | 414/797 |

*Primary Examiner*—William E. Terrell
*Assistant Examiner*—Joe Dillon, Jr.
*Attorney, Agent, or Firm*—Pearne, Gordon, McCoy & Granger LLP

[57] ABSTRACT

Method and apparatus for transporting a lead frame which can be shared for directly-stacked lead frames and for frames—which are stacked while inter leaves are sandwiched, respectively, between them—and which allows two lead frames sticking to each other to be efficiently recovered without deactivating the lead frame transport apparatus. An apparatus for transporting a lead frame to a transport path from a stack of lead frames stored in a magazine through use of a transport head are provided with a recovery head, two-sheet pick-up sensors, and a recovery section for recovering an inter leaf which doubles as a recovery section for recovering two lead frames sticking to each other. In a case where the lead frames are stacked while the inter leaves are sandwiched, respectively, between them, the recovery head transports the inter leaf to the recovery section, where the inter leaf is recovered. In contrast, in a case where the lead frames are directly stacked, if a transport head erroneously picks up two lead frames, the two-sheet pick-up sensors detect the picking up of two lead frames. The two lead frames are temporarily returned to the magazine and are transported by means of the recovery head to the recovery section, where they are recovered.

5 Claims, 6 Drawing Sheets

METHOD OF AND APPARATUS FOR TRANSPORTING LEAD FRAME

BACKGROUND OF THE INVENTION

1. Field of the Invention

The present invention relates to a method of and apparatus for transporting lead frames stacked on a magazine to a transport path one by one.

2. Description of the Related Art

Lead frames for use in the assembly of electronic components are stacked on a magazine and are transported to a transport path one by one by means of a transport head. Subsequently, the lead frame is transported to a line for assembling electronic components, such as a die bonder, along the transport path. In this case, the lead frames are stacked on the magazine in two ways, namely, a way in which lead frames are directly stacked on the magazine (this form will be herein referred to as a "direct stacking mode"), and a way in which lead frames are stacked while inter leaves are sandwiched, respectively, between them (this form will be herein referred to as an "inter-leaf stacking mode").

Figure 1:
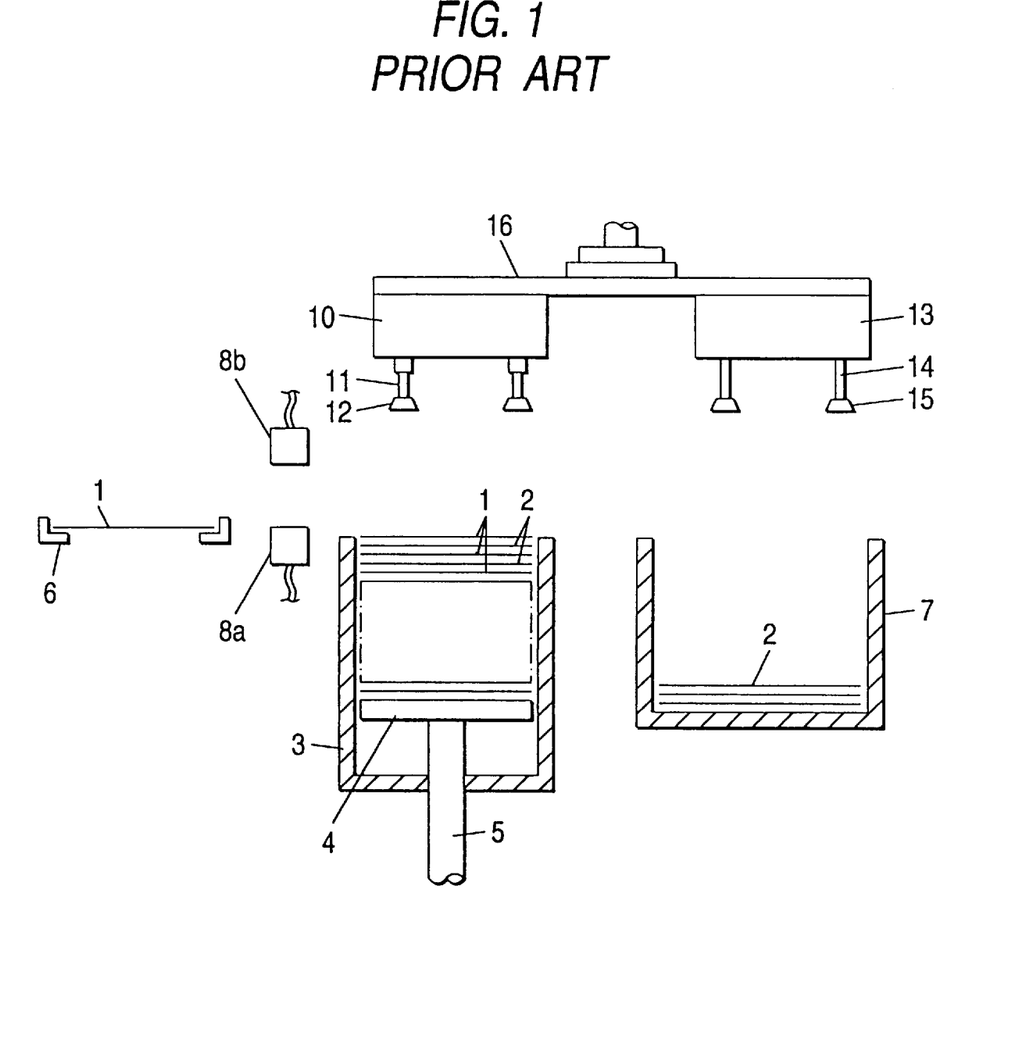
FIG. 1 is a side view showing a conventional lead frame transport apparatus.

FIG. 1 is a side view showing an existing apparatus for transporting lead frames. In this example, lead frames 1 are stacked by the inter-leaf stacking mode; that is, lead frames 1 and inter leaves 2 are alternately stacked in a magazine 3 such that the inter leaves 2 are sandwiched, respectively, between the lead frames 1. An elevation plate 4 is provided in the magazine 3, and the lead frames 1 and the inter leaves 2 are stacked on the elevation plate 4 which is actuated so as to be raised or lowered by means of drive means (not shown). As a result of the elevation plate 4 being gradually elevated by an elevation rod 5, the upper surface of the topmost lead frame 1 is maintained at a given level.

A transport path 6 for use with the lead frame 1 is disposed besides the magazine 3. Two-sheet pick-up sensors 8a, 8b are disposed between the magazine 3 and the transport path 6. A recovery section 7 for recovering the inter leaves 2 is disposed on the side of the magazine 3 opposite to the side thereof facing the transport path 6. A transport head 10 has nozzles 11 for vacuum-chucking the lead frame 1, and each of the nozzles 11 has a suction pad 12 at the lower end. A recovery head 13 has nozzles 14 and suction pads 15, both of which vacuum-chuck the inter leaf 2. The transport head 10 and the recovery head 13 are integrally joined together by means of a frame 16 and are moved in vertical and horizontal directions by means of unillustrated means.

The operation of the foregoing existing lead frame transport apparatus will now be described. First, an explanation will describe the lead frames 1 stacked by the inter-leaf stacking mode; that is, a case where the inter leaves 2 are sandwiched, respectively, between the lead frames 1. The transport head 10 is raised or lowered in the space above the magazine 3 to thereby vacuum-chuck the topmost lead frame 1 stored within the magazine 3. Prior to picking up the topmost lead frame 1 from the magazine 3 by vacuum chucking, the inter leaf 2 laid on the topmost lead frame 1 is picked up by the recovery head 13 and is recovered by the recovery section 7.

Next, the transport head 10 horizontally travels to the position immediately above the transport path 6 while maintaining the picked-up lead frame 1 and is lowered at the position, thereby loading the lead frame 1 on the transport path 6. On its way to the transport path 6, the lead frame 1 is subjected to a determination, by the two-sheet pick-up sensors 8a, 8b, as to whether or not two lead frames 1 are erroneously picked up. The lead frame 1 loaded on the transport path 6 is sent to a line for assembling electronic components, such as a die bonder.

Simultaneously with the transport head 10 being lowered to load the lead frame 1 on the transport 6, the recovery head 13 is lowered to the magazine 13, thereby vacuum-chucking the inter leaf 2. The recovery head 13 travels to the position immediately above the recovery section 7 while vacuum-chucking the inter leaf 2. Simultaneously with the transport head 10 being lowered to vacuum-chuck the next lead frame 1, the recovery head 13 releases the inter leaf 2 from a vacuum-chucked state, so that the recovered inter leaf 2 is placed on the recovery section 7.

Next, an explanation will describe lead frames stacked by the direct stacking mode. In this case, since there are no inter leaves 2 to be recovered by the recovery head 13, the recovery head 13 is in an idle state in which it does not perform a vacuum-chucking operation. Only the transport head 10 performs operations in the same manner as does in the foregoing case of the lead frames stacked by the inter-leaf stacking mode.

The lead frame 1 is manufactured by processing metal into a thin metal plate having light weight and a smooth surface. For this reason, when the lead frame 1 is picked up from a stack of lead frames-which are directly stacked in close contact with one another within the magazine 3-by vacuum chucking, so-called "two-sheet pick-up error"; that is, two frame leads instead of one being erroneously picked up by one operation, will occur with certain frequency. This error can be attributed to several reasons; that is, adhesion strength originating from the aforementioned surface smoothness, or minute burrs formed along the edges of the lead frames 1 meshing with one another. A technique for preventing such a two-sheet pick-up error has not yet been established. Therefore, in order to prevent two lead frames 1 from being transported, the lead frame transport apparatus performs the detection of two lead frames in the course of the lead frame 1 being transported to the transport path 6 from the magazine 3.

Since the two-sheet pick-up error does not occur with high frequency, it is not desirable to provide the lead frame transport apparatus with a recovery mechanism to recover the lead frames 1 in the event of two lead frames being picked up, from the viewpoint of cost. For this reason, when the two-sheet pick-up error sensors detect the picking up of two lead frames, an alarm is issued simultaneously with the lead frame transport apparatus being deactivated. The lead frame apparatus has the disadvantage of requiring restart of the lead frame transport apparatus after the operator has taken necessary steps, such as steps to manually recover the two lead frames 1.

SUMMARY OF THE INVENTION

Accordingly, the object of the present invention is to provide a method of and apparatus for transporting a lead frame which can be shared for directly-stacked lead frames and for frames-which are stacked while inter leaves are sandwiched, respectively, between them-and which allows two lead frames stacking to each other to be efficiently recovered without deactivating the lead frame transport apparatus.

To achieve the foregoing and other objectives, and in accordance with the purposes of the present invention, there is provided a lead frame transport method for use with a lead frame transport apparatus including a magazine for storing lead frames in a stacked manner, a transport head for taking the lead frame out of the magazine, an inter leaf recovery head which is integrally joined to the transport head and recovers an inter leaf, an interleaf recovery section for receiving the inter leaf taken out by the recovery head, vertically actuation means for vertically actuating the transport and recovery heads in an integrated fashion, horizontally actuation means for horizontally actuating the transport and recovery heads in an integrated fashion, a transport path for transporting the lead frame received from the transport head, and two-sheet pick-up error detection means for detecting picking up of two lead frames, the method comprising the steps of: temporarily returning two lead frames to the magazine if the two-sheet pick-up error detection means detects the transport head having picked up two lead frames from the stack of lead frames being directly piled; and taking the two lead frames out of the magazine and transporting the lead frames by means of the recovery head to the inter leaf recovery section, where the lead frames are recovered, thereby allowing the lead frame transport method to be shared for directly-stacked lead frames and for frames which are stacked while inter leaves are sandwiched, respectively, between them.

Preferably, the detection of two lead frames is performed while the lead frame is being vacuum-chucked by nozzles of the transport head.

Preferably, the lead frame transport apparatus comprises nozzles and probes used for vacuum-chucking the lead frame, and the lead frame transport method further comprises the steps of: lowering the transport head until the nozzles come into a contact with the lead frame, and lowering the transport head further until the probes come into contact with the lead frame; making a decision as to whether or not the nozzles are in contact with the lead frame or an inter leaf on the basis of detection of a shortcircuit between the probes; and immediately picking up the lead frame through vacuum chucking by means of the nozzles if the nozzles are determined to be in contact with the lead frame.

In accordance with another aspect of the present invention, there is provided a lead frame transport apparatus including a magazine for storing lead frames in a stacked manner, a transport head for taking the lead frame out of the magazine, an inter leaf recovery head which is integrally joined to the transport head and recovers an inter leaf, an interleaf recovery section for receiving the inter leaf taken out by the recovery head, vertically actuation means for vertically actuating the transport and recovery heads in an integrated fashion, horizontally actuation means for horizontally actuating the transport and recovery heads in an integrated fashion, a transport path for transporting the lead frame received from the transport head, and two-sheet pick-up error detection means for detecting picking up of two lead frames, the apparatus comprising: a storage section for memorizing whether the lead frames are directly stacked or stacked while inter leaves are sandwiched, respectively, between them, according to the types of lead frames; and a control section which temporarily returns two lead frames to the magazine if the two-sheet pick-up error detection means detects the transport head having picked up two lead frames from the stack of lead frames being directly piled and which takes the two lead frames out of the magazine and transports by means of the recovery head to the inter leaf recovery section, where they are recovered.

Preferably, the transport head has nozzles and probes used for vacuum chucking the lead frame. Each of the nozzles is resiliently retained by a spring so as to be vertically movable. While the lower end belonging to each of the nozzles comes into contact with the lead frame stored within the magazine as a result of the transport head being lowered, the springs are compressed to thereby permit the probes to come into contact with the lead frame. In contrast, while the transport head is held in an elevated position, the springs are in an extended state, so that the lower end belonging to each of the nozzles projects downward beyond the lower end belonging to each of the probes.

In accordance with the present invention, two-sheet pick-up sensors detect picking up of two lead frames, and the thus-detected two lead frames are temporarily returned to a magazine. The lead frames are then transported by a recovery head to a recovery section, where they are recovered. Accordingly, the lead frames can be continually transported without deactivating the lead frame transport apparatus. Further, the inter leaf recovery section used for frames—which are stacked while inter leaves are sandwiched, respectively, between them—is also utilized as a lead frame recovery section for recovering two lead frames sticking to each other in the case of directly stacked lead frames. Consequently, the lead frame transport method and apparatus in accordance with the present invention can be shared for directly-stacked lead frames and for lead frames which are stacked while inter leaves are sandwiched, respectively, between them.

Still other objects of the present invention will become readily apparent to those skilled in the art from the following description wherein there is shown and described a preferred embodiment of the present invention, simply by way of illustration of one of the modes best suited to carry out the invention. As it will be realized, the invention is capable of other different embodiments, and its several details are capable of modifications in various, obvious aspects, all without departing from the present invention. Accordingly, the drawings and description will be regarded as illustrative in nature and not as restrictive.

DETAILED DESCRIPTION OF THE INVENTION

Figure 2:
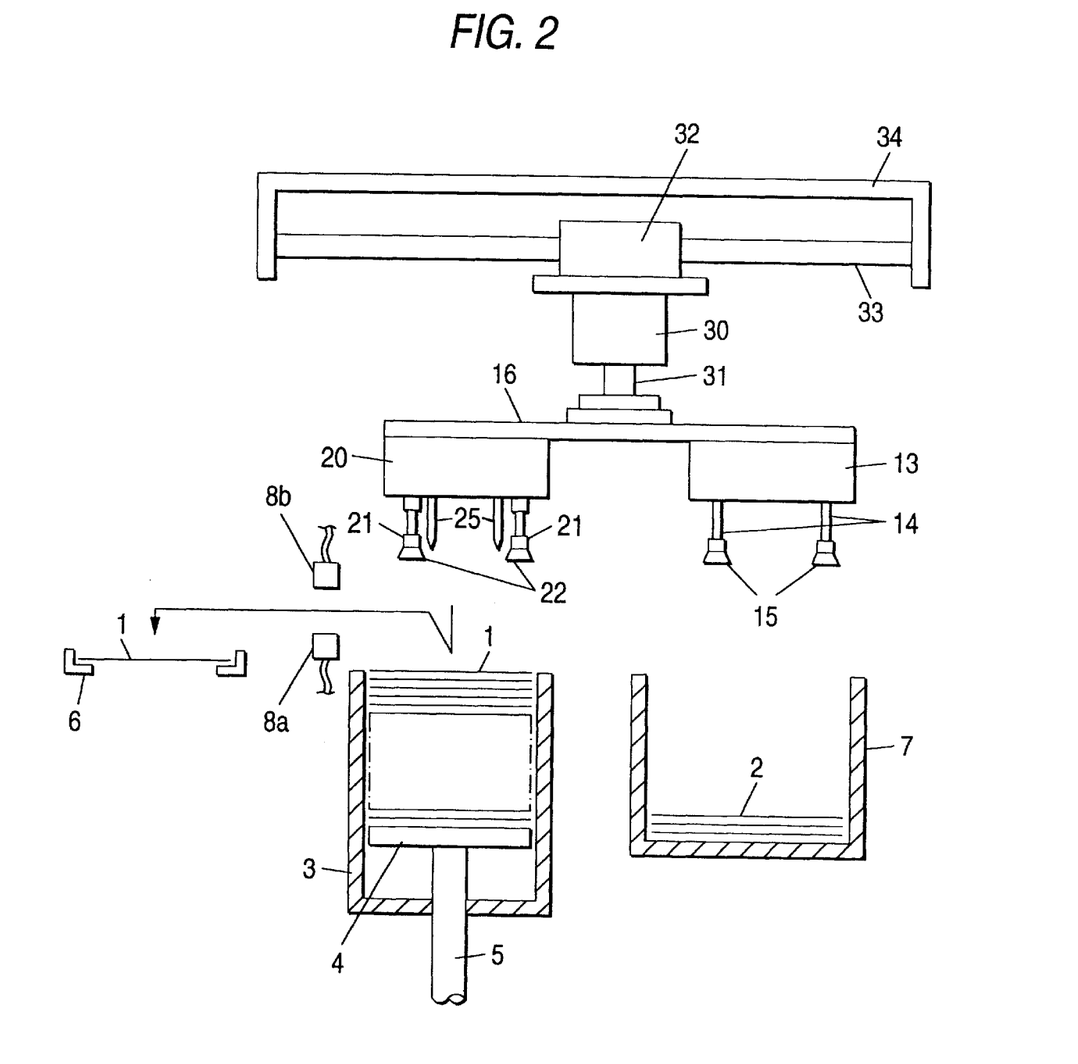
FIG. 2 is a side view showing a lead frame transport apparatus in accordance with one embodiment of the present invention.
Figure 3:
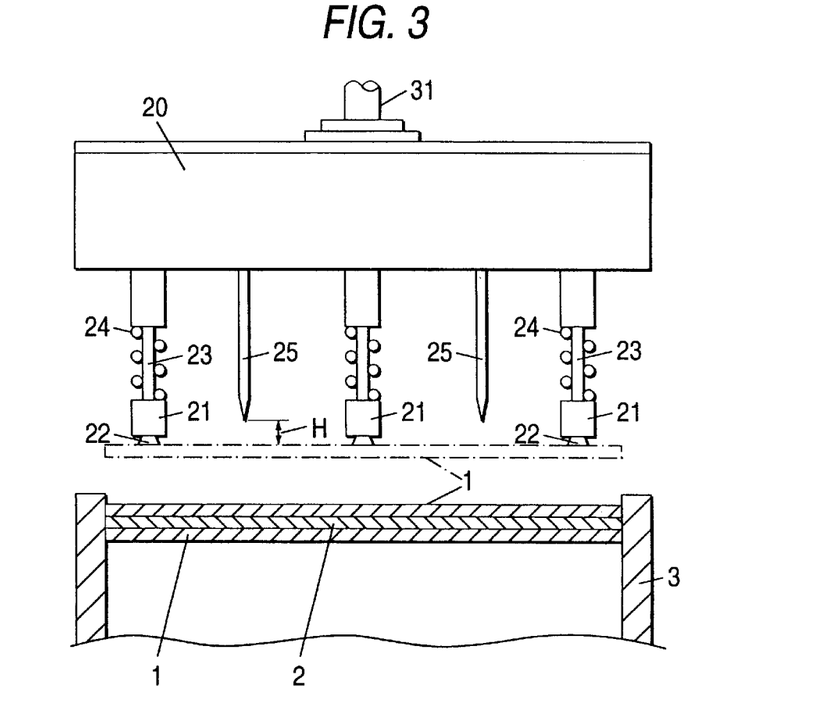
FIG. 3 is a front view showing a transport head of the lead frame transport apparatus in accordance with the embodiment of the present invention.
Figure 4:
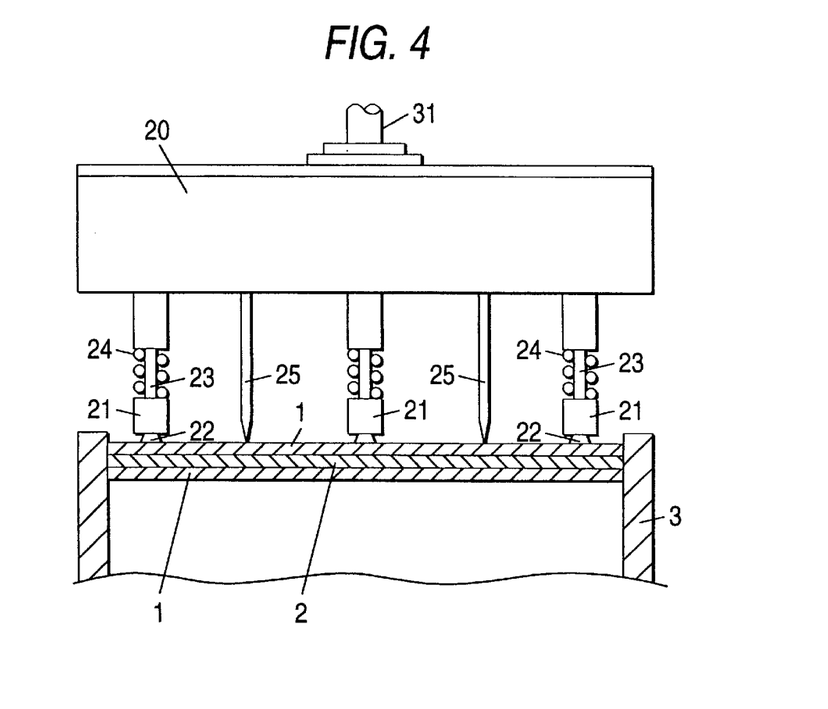
FIG. 4 is a front view showing the transport head of the lead frame transport apparatus in accordance with the embodiment of the present invention.
Figure 5:
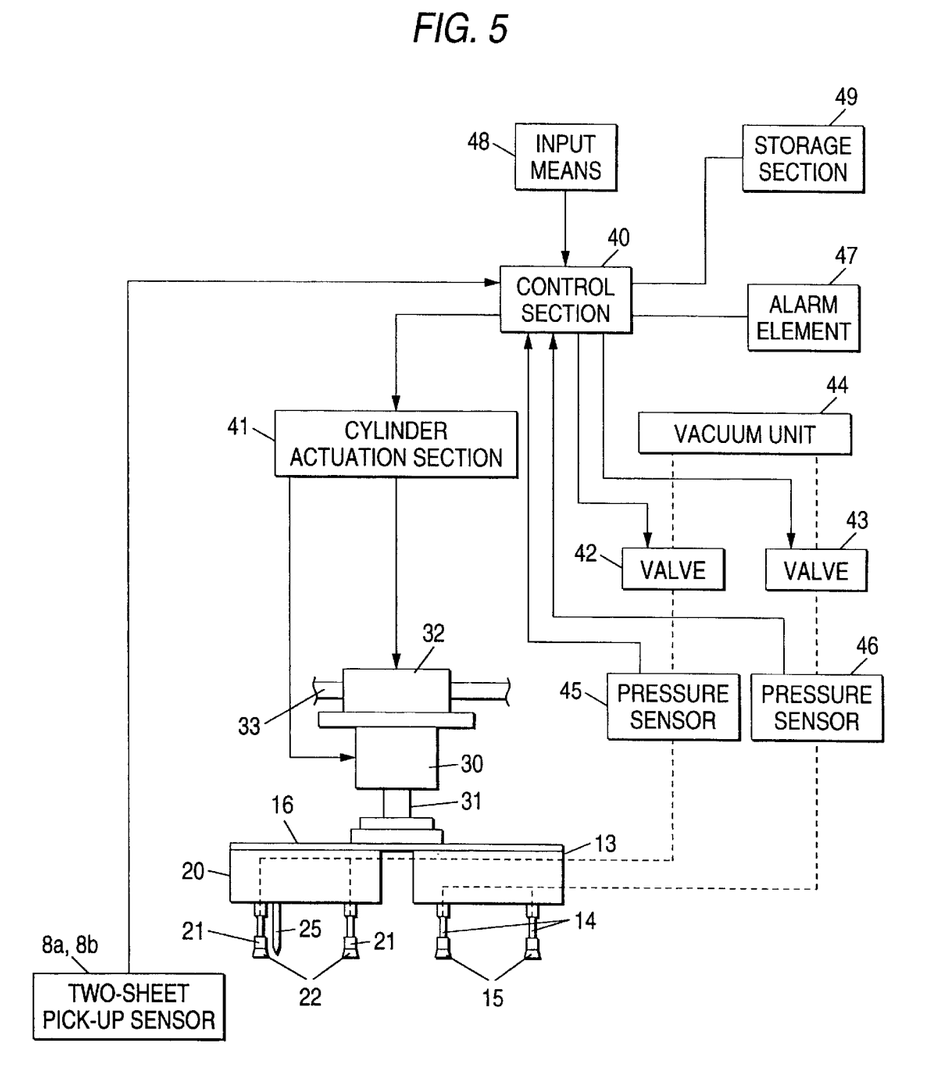
FIG. 5 is a block diagram showing a control system of the lead frame transport apparatus in accordance with the embodiment of the present invention.
Figure 6:
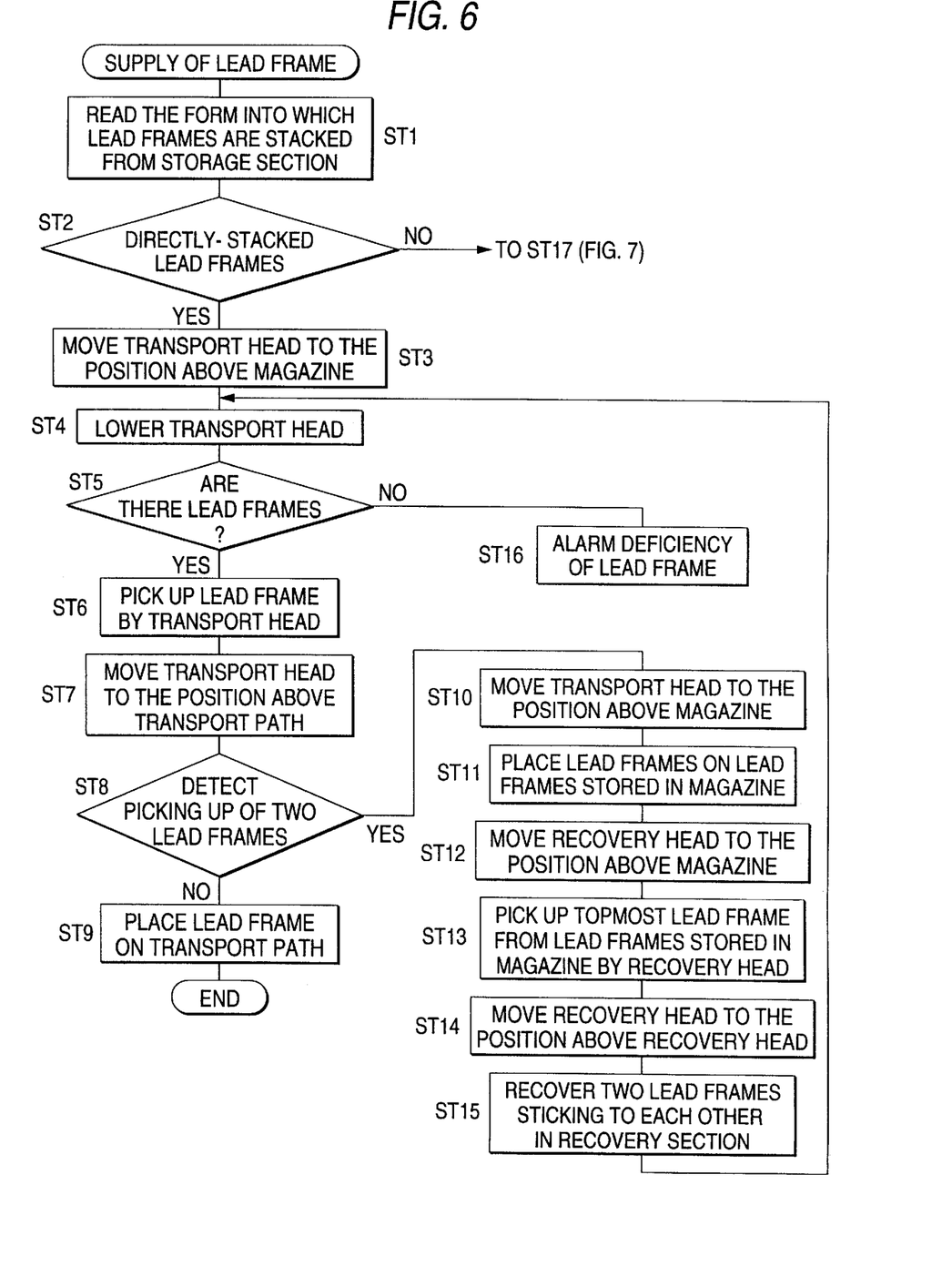
FIG. 6 is a flowchart showing the operation of the lead frame transport apparatus in accordance with the embodiment of the present invention.
Figure 7:
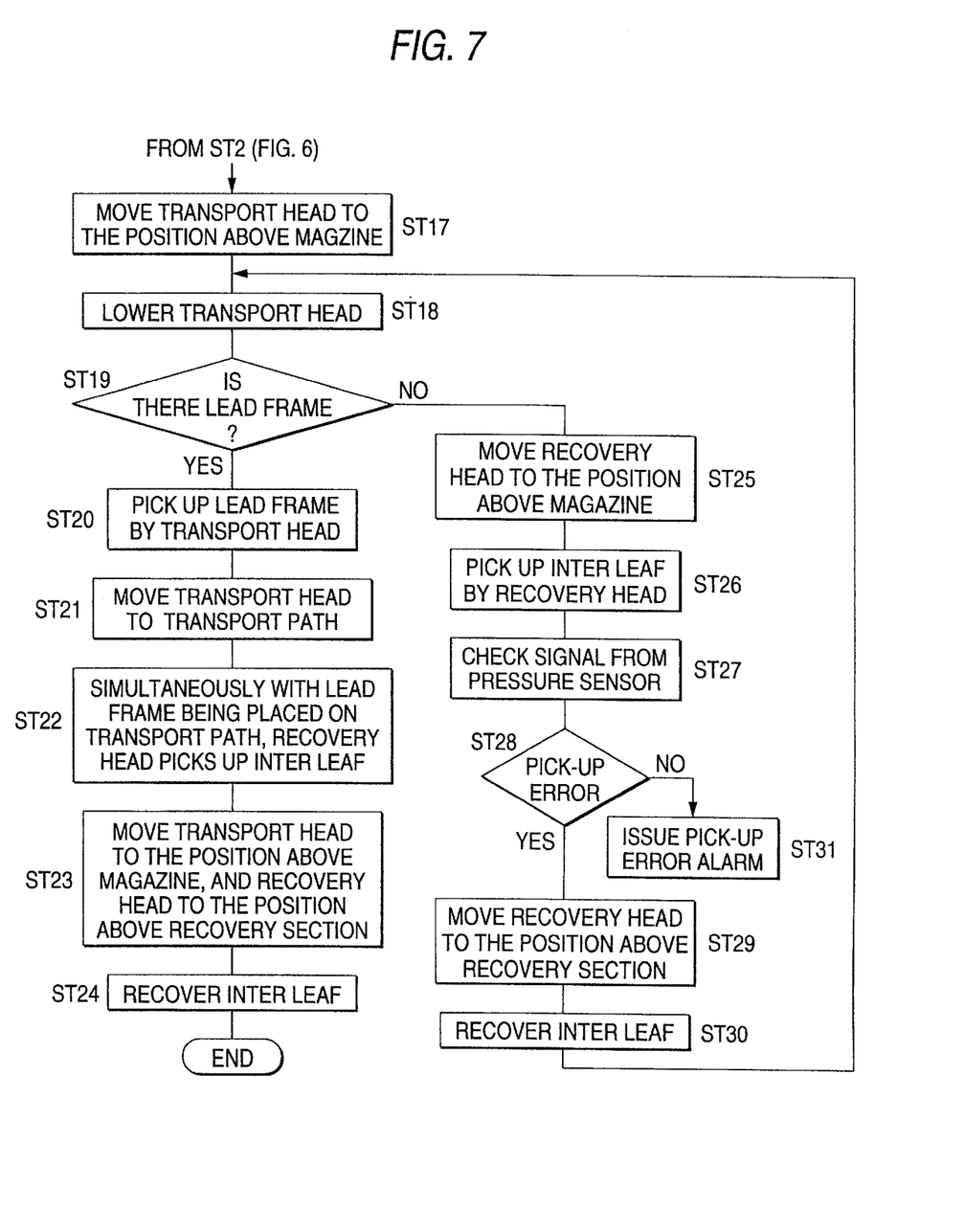
FIG. 7 is a flowchart showing the operation of the lead frame transport apparatus in accordance with the embodiment of the present invention.

In accordance with the present invention, an inter leaf recovery section used for lead frames—which are stacked while inter leaves being sandwiched, respectively, between the lead frames—is used as a lead frame recovery section for storing two lead frames erroneously picked up from a stack of lead frames being directly piled. In the case of the lead frames being directly piled, if two-sheet pick-up sensors detect the picking up of two lead frames, the thus-detected two lead frames are temporarily returned to a magazine. The two lead frames are subsequently transported through use of a recovery head to the recovery section, where they are recovered. Accordingly, lead frames can be continually transported without deactivating the lead frame transport apparatus. By reference to the drawings, an embodiment of the present invention will now be described. FIG. 2 is a side view showing a lead frame transport apparatus in accordance with one embodiment of the present invention; FIGS. 3 and 4 are front views showing a transport head of the lead frame transport; FIG. 5 is a block diagram showing a control system of the lead frame transport apparatus; and FIGS. 6 and 7 are flowcharts showing the operation of the lead frame transport apparatus. In these drawings, the elements which are the same as those of the conventional lead frame apparatus shown in FIG. 1 will be assigned the same reference numerals.

By reference to FIG. 2, the overall structure of the lead frame transport apparatus will be described. Lead frames 1 are stored in a magazine 3 by any one of the modes; namely, an inter-leaf stacking mode and a direct stacking mode. An elevation plate 4 is provided in the magazine 3, and the lead frames 1 and inter leaves 2 are loaded on the elevation plate 4. As a result of the elevation plate 4 being gradually elevated by an elevation rod 5, the upper surface of the topmost lead frame 1 is maintained at a given level.

A transport path 6 for use with the lead frame 1 is disposed besides the magazine 3. A recovery section 7 for recovering the inter leaves 2 is disposed on the side of the magazine 3 opposite to the side thereof facing the transport path 6. As will be described later, the recovery section 7 for recovering the inter leaves 2 is used as a recovery section for recovering the lead frames 1 in the case of lead frames being directly stacked. With this structure, the lead frame transport apparatus can be shared for directly-stacked lead frames and for lead frames which are stacked while the inter leaves 2 are sandwiched, respectively, between them. A transport head 20 has nozzles 21 for vacuum-chucking the lead frame 1, and each of the nozzles 21 has a suction pad 22 at the lower end. A recovery head 13 has nozzles 14 and suction pads 15, both of which vacuum-chuck the inter leaf 2 and erroneously-picked-up two lead frames 1. The transport head 20 and the recovery head 13 are integrally joined together by means of a frame 16. As is obvious from FIG. 2, the transport path 6 and the recovery section 7 are spaced at an interval away from the magazine 3 in a horizontal direction. The transport head 20 and the recovery head 13 are mounted on the frame 16 so as to also be spaced at the same interval apart from each other in a horizontal direction.

The frame 16 is attached to the lower end of a rod 31 of a cylinder 30. In association with the projecting and retracting actions of the rod 31, the transport head 20 and the recovery head 13 are lowered and raised. In short, the cylinder 30 serves as means for vertically actuating the transport head 20 and the recovery head 13. A slider 32 is connected to an upper portion of the cylinder 30 and is fitted around a slider 32 in a slidable manner. The shaft 33 is supported by a support frame 34, and the slider 32 horizontally travels along the shaft 33 by means of pneumatic pressure. The slider 32 and the shaft 33 act as means for horizontally actuating the transport head 20 and the recovery head 13.

Two-sheet pick-up sensors 8a, 8b are provided in the passageway-over which the lead frame 1 is transported between the magazine 3 and the transport path 6-in such a way as to become opposite to each other in the vertical direction. On the basis of an eddy current induced as a result of presence of the metal plate between the two-sheet pick-up sensors 8a, 8b, the sensors detect whether there is (or are) one or two metal sheets between the sensors. As a result of the lead frame 1 vacuum-chucked by the transport head 20 crossing the area between the two-sheet pick-up sensors 8a, 8b, a detection is performed as to whether there is (are) one or two or more lead frames 1. It is also possible to detect the picking up of two lead frames through use of a fiber sensor, or the like, in the transport path.

Next, by reference to FIGS. 3 and 4, the structure of the transport head 20 will be described. The transport head 20 has a plurality of nozzles 21, and a suction pad 22 is attached to the lower end of each of the nozzles 21. The nozzle 21 is attached to the lower end of a nozzle shaft 23 of each nozzle 21, and a spring 24 is coiled around the nozzle shaft 23. The nozzle 21 is resiliently retained so as to be vertically movable by means of the force of the spring 24 which is omitted from FIG. 2. Two pin-shaped probes 25 are provided in upright positions on the lower surface of the transport head 20.

As shown in FIG. 3, in a state in which the suction pads 22 keep themselves out of contact with the lead frame 1 housed in the magazine 3, the nozzles 21 are resiliently forced so as to project downward beyond the lower end of each of the probes 25 by means of the springs 24 (there is a difference in height, H, between the suction pads and the probes 25). As shown in FIG. 4, when the transport head 20 is lowered to thereby bring the suction pads 22 into contact with the lead frame 1, the springs 24 are brought into a compressed state, so that the nozzles 21 are upwardly pulled in. As a result, the probes 25 come into contact with the lead frame 1.

By reference to FIG. 5, a control system of the lead frame transport apparatus will now be described. Reference numeral 40 designates a control section which controls a cylinder actuation section 41 for actuating the cylinder 30, valves 42, 43, and an alarm element 47. Input means 48 corresponds to a keyboard or the like. The type of lead frame 1 to be transported is entered by the operator through use of the input means 48. Data regarding the lead frame 1 to be transported are stored in storage section 49. More specifically, when the type of lead frame 1 is entered by the operator, data regarding whether the lead frames 1 are directly stacked or stacked while inter leaves are sandwiched respectively between them, are stored in the storage section 49 via the control section 40.

The valves 42, 43 are connected to a vacuum unit 44, as well as to the nozzles 21 of the transport head 20 and the nozzles 14 of the recovery head 13 via pressure sensors 45 and 46, respectively. Outputs from the probes 25 and the pressure sensors 45, 46 are delivered to the control section 40. As a result of being vertically actuated at the position above the magazine 3, the transport head 20 and the recovery head 13 pick up the lead frame 1 and the inter leaf 2. In this case, the pressure required by the transport head and the recovery head is detected by means of pressure sensors 45, 46. If the value detected by the pressure sensors 45, 46 does not fall to a value smaller than a threshold value, the control section 40 decides that there should be a pick up error, namely, that the suction pads 22, 15 should have failed to vacuum-chuck the lead frame 1 or the inter leaf 2.

When the suction pads 22, 15 vacuum-chuck the lead frame 1 or the inter leaf 2, a suction channel is closed, thereby resulting in a pressure drop. If the suction pads have failed to vacuum-chuck the lead frame or the inter leaf, no pressure drop will arise. In other words, a check is made so as to detect an pick-up error immediately after the transport head 20 (or the recovery head 13) has picked up the lead frame 1 (or the inter leaf 2). As a matter of course, a method of optically detecting the lead frame 1 or the inter layer 2 other than the detecting method, which employs the pressure sensors 45, 46, may also be employed as a method of checking a pick-up error.

The lead frame transport apparatus has a configuration such as that mentioned previously, and the operation of the apparatus will now be described with reference to the flowcharts shown in FIGS. 6 and 7. In the flowchart shown in FIG. 6, when the lead frame transport apparatus is activated, the manner in which the lead frames 1 are supplied is read from the storage section 49 in step ST1. Next, with regard to the manner of supply of the lead frames 1, a decision is made as to whether the lead frames 1 are directly stacked or stacked while the inter leaves 2 are sandwiched, respectively, between them (ST2). If the lead frames 1 are directly stacked, the processing is performed according to the flowchart shown in FIG. 6. In contrast, if the lead frames 1 are stacked while inter leaves are sandwiched, respectively, between them, the processing is performed according to the flowchart shown in FIG. 7.

First, the flowchart used for the case of directly-stacked lead frames will be described by reference to FIG. 6. The transport head 20 is traveled to the position above the magazine 3 (ST3). Subsequently, the transport head 20 is lowered (ST4). In step ST5, by a method, which will be described later, a decision is made as to whether or not there is a lead frame 1. FIG. 4 shows the transport head 20 in a lowered position while the suction pads 22 are in contact with the lead frame 1. In this state, the springs 24 are compressed, so that the lower end of each of the probes 25 comes into contact with the lead frame 1. Consequently, a decision is made as to whether or not there is a lead frame 1 possessing the conductivity by detection of a shortcircuit between the probes 25.

If there is not any lead frame 1, an alarm is issued to indicate a deficiency of lead frames (ST16). If there is a lead frame 1, the transport head 20 picks up the lead frame 1 (ST6). In this case, as mentioned previously, the pressure sensor 45 checks a pick-up error. Subsequently, the transport head 20 is moved toward the transport path (ST7). On its way to the transport path, the transport head 20 crosses the space between the two-sheet pick-up sensors 8a, 8b to thereby detect the picking up of two lead frames (ST8). If one lead frame is picked up, the lead frame 1 is loaded on the transport path 6 (ST9), one cycle of transporting operations will now be completed.

If it is detected in step ST8 that the transport head 20 erroneously picks up two lead frames, the processing will proceed to a processing step, which will be described later. The transport head 20, which is determined to have erroneously picked up two lead frames 1, is moved to the position above the magazine 3 (ST10), and the two lead frames are placed on the lead frame 1 stored in the magazine 3 (ST11). Subsequently, the recovery head 13 is traveled to the position above the magazine 3 (ST12), where the recovery head picks up the topmost two lead frames 1 sticking to each other from the magazine 3 (ST13). Next, the recovery head 13 is moved to the position above the recovery section 7 (ST14), and the two lead frames 1 sticking to each other are recovered by the recovery section 7 (ST15). One cycle of processes for recovering two lead frames is now completed, and the processing returns to an ordinary flow of transporting operations.

As mentioned previously, even if the transport head 20 erroneously picks up two lead frames, the lead frames 1 are automatically recovered by the recovery section 7. Accordingly, the lead frame transport apparatus is capable of continually transporting the lead frames 1 without deactivation of the transport apparatus.

Next, by reference to FIG. 7, there will be described a flow of transporting operations in the case of lead frames being stacked while inter leaves are sandwiched, respectively, between them. In step ST2 shown in FIG. 6, if it is determined that lead frames are stacked while inter leaves are sandwiched, respectively, between them, the transport head 20 is moved to the position above the magazine 3 (ST17). Subsequently, the transport head 20 is lowered (ST18). In step ST19, by a method, which will be described later, a decision is made as to whether or not there is a lead frame 1 (or an inter leaf 2). FIG. 4 shows the transport head 20 in a lowered position while the suction pads 22 are in contact with the lead frame 1. In this state, the springs 24 are compressed, so that the lower end of each of the probes 25 comes into contact with the lead frame 1.

Consequently, a decision is made as to whether there is a lead frame 1 possessing the conductivity or the inter leaf 2 having the dielectric characteristics by detection of a short-circuit between the probes 25. If a lead frame 1 is detected, the thus-detected lead frame 1 is immediately picked up by means of the suction pads 22 through vacuum chucking (ST20).

Subsequently, the transport head 20 is traveled to the position above the transport path 6 (ST21), where the transport head 20 and the recovery head 13 are lowered. Simultaneously with the transport head 20 placing the lead frame 1 on the transport path 6, the recovery head 13 picks up the inter leaf 2 (ST22). Even in this case, on its way to the transport path 6, the transport head 20 is subjected to the two-sheet pick-up detection operation by the two-sheet pick-up sensors 8a, 8b. This is because, on rare occasion, one lead frame 1 is directly stacked on another lead frame 1 because of erroneous lamination of inter leaves 2, and two lead frames 1 are picked up at one time. The flow of operations following the detection of picking up of two lead frames is the same as that is employed for the previous case where lead frames are directly stacked.

Next, the transport head 20 is traveled to the position above the magazine 3, and the recovery head 13 is simultaneously traveled to the position above the recovery section 7 (ST23), where the inter leaf 2 is recovered (ST24). As mentioned previously, in the case of directly-stacked lead frames, the recovery section 7 is utilized as the recovery section for recovering two lead frames sticking to each other. In contrast, in the case of lead frames which are stacked while inter leaves are sandwiched, respectively, between them, the recovery section 7 is utilized as the recovery section for recovering the inter leaves 2. Accordingly, in accordance with the foregoing concepts of the present invention, the same lead transport method (or apparatus) may be shared for directly-stacked lead frames and for lead frames which are stacked while inter leaves are sandwiched, respectively, between them.

If the inter leaf 2 is detected instead of the lead frame 1 in step ST19, the processing follows a flow of processing operations given below. First, the recovery head 13 is traveled to the position above the magazine 3 (ST25). Next, the recovery head 13 is lowered to pick up the inter leaf 2

(ST26). A signal output from the pressure sensor 46 is checked at this time (ST27) to thereby make a decision as to whether or not there is an pick-up error (ST28). If there is no pick-up error, the recovery head 13 is traveled to the position above the recovery section 7 (ST29), where the inter leaf 2 is recovered (ST30). If it is decided in step ST28 that there is a pick-up error, a pick-up error alarm is issued (ST31). One cycle of the transporting operations is now completed. The same cycle of the transporting operations will be repeated hereafter. As mentioned previously, even if two lead frames are picked up in a case where lead frames are stacked while interleaves are sandwiched respectively between them, lead frames 1 can be continually transported without deactivation of the transport apparatus.

The foregoing description of the preferred embodiment of the present invention has been presented for purpose of illustration and description. It is not intended to be exhaustive or to limit the invention to the precise form disclosed. Obvious modifications or variations are possible in light of the above teachings. The embodiment was chosen and described to provide the best illustration of the principle of the invention and its practical application to thereby enable one of ordinary skill in the art to utilize the invention in various embodiments and with various modifications as are suited to the particular use contemplated. All such modifications and variations are within the scope of the invention as determined by the breadth to which they are fairly, legally, and equitably entitled.

What is claimed is:

1. A lead frame transport method for use with a lead frame transport apparatus including a magazine for storing lead frames in a stacked manner, a transport head for taking the lead frame out of the magazine, an inter leaf recovery head which is integrally joined to the transport head for recovering an inter leaf, an interleaf recovery section for receiving an inter leaf taken out by the recovery head, vertically actuation means for vertically actuating the transport and recovery heads in an integrated fashion, horizontally actuation means for horizontally actuating the transport and recovery heads in an integrated fashion, a transport path for transporting the lead frame received from the transport head, and two-sheet pick-up error detection means for detecting picking up of two lead frames, the method comprising the steps of:

temporarily returning two lead frames back to the magazine if the two-sheet pick-up error detection means detects the transport head having picked up two lead frames; and taking the two lead frames out of the magazine and transporting the lead frames by means of the recovery head to the inter leaf recovery section, where the lead frames are recovered, thereby allowing the lead frame transport method to be applied to either directly-stacked lead frames or frames which are stacked with inter leaves sandwiched between them.

2. The lead frame transport method as claimed in claim 1, wherein the detection of two lead frames is performed while the lead frame is being vacuum-chucked by nozzles of the transport head.

3. The lead frame transport method as claimed in claim 1, wherein the lead frame transport apparatus comprises nozzles and probes used for vacuum-chucking the lead frame, and wherein the lead frame transport method further comprises the steps of:

lowering the transport head until the nozzles come into contact with the lead frame, and lowering the transport head further until the probes come into contact with the lead frame;

making a decision as to whether or not the nozzles are in contact with the lead frame or an inter leaf on the basis of detection of a shortcircuit between the probes; and immediately picking up the lead frame through vacuum chucking by means of the nozzles if the nozzles are determined to be in contact with the lead frame.

4. A lead frame transport apparatus comprising:

a magazine for storing lead frames in a stacked manner;

a transport head for taking the lead frame out of the magazine;

an inter leaf recovery head which is integrally joined to the transport head for recovering an inter leaf;

an interleaf recovery section for receiving an inter leaf taken out by the recovery head, vertically actuation means for vertically actuating the transport and recovery heads in an integrated fashion;

horizontally actuation means for horizontally actuating the transport and recovery heads in an integrated fashion;

a transport path for transporting the lead frame received from the transport head;

two-sheet pick-up error detection means for detecting picking up of two lead frames;

a storage section for memorizing whether the lead frames are directly stacked or stacked while inter leaves are sandwiched, respectively, between them; and a control section which temporarily returns two lead frames to the magazine if the two-sheet pick-up error detection means detects the transport head having picked up two lead frames from the stack of lead frames being directly piled and which takes the two lead frames out of the magazine and transports by means of the recovery head to the inter leaf recovery section, where they are recovered.

5. The lead frame transport method as claimed in claim 4, wherein the transport head has nozzles and probes used for vacuum chucking the lead frame, and each of the nozzles is resiliently retained by a spring so as to be vertically movable, and wherein while a lower end belonging to each of the nozzles comes into contact with the lead frame stored within the magazine as a result of the transport head being lowered, the springs are compressed to thereby permit the probes to come into contact with the lead frame, and, in contrast, while the transport head is held in an elevated position, the springs are in an extended state, so that the lower end belonging to each of the nozzles projects downward beyond the lower end belonging to each of the probes.

* * * * *